US011625239B2

(12) United States Patent
Chen

(10) Patent No.: US 11,625,239 B2
(45) Date of Patent: Apr. 11, 2023

(54) SYSTEMS AND METHODS SUPPORTING FINE/COARSE-GRAINED DEPLOYMENT OF SOURCE CODE TO ENVIRONMENTS VIA VERSION CONTROL SYSTEMS

(71) Applicant: salesforce.com, inc., San Francisco, CA (US)

(72) Inventor: Nicholas Chun Yuan Chen, San Franscisco, CA (US)

(73) Assignee: Salesforce, Inc., San Francisco, CA (US)

( * ) Notice: Subject to any disclaimer, the term of this patent is extended or adjusted under 35 U.S.C. 154(b) by 14 days.

(21) Appl. No.: 17/467,722

(22) Filed: Sep. 7, 2021

(65) Prior Publication Data

US 2022/0374231 A1 Nov. 24, 2022

Related U.S. Application Data

(60) Provisional application No. 63/191,730, filed on May 21, 2021.

(51) Int. Cl.

| | |
|---|---|
| ***G06F 9/44*** | (2018.01) |
| ***G06F 11/36*** | (2006.01) |
| ***G06F 8/71*** | (2018.01) |
| ***G06F 8/60*** | (2018.01) |
| ***G06F 21/57*** | (2013.01) |
| *G06F 3/04847* | (2022.01) |

(52) U.S. Cl.
CPC .................. *G06F 8/71* (2013.01); *G06F 8/60* (2013.01); *G06F 3/04847* (2013.01)

(58) Field of Classification Search
CPC ........... G06F 8/71; G06F 8/60; G06F 3/04847
See application file for complete search history.

(56) References Cited

U.S. PATENT DOCUMENTS 10,768,929 B1 * 9/2020 Turner ...................... G06F 8/38

OTHER PUBLICATIONS

Hashimoto et al., A comprehensive and scalable method for analyzing fine-grained source code change patterns, 10 pages (Year: 2015).*

* cited by examiner

*Primary Examiner* — Thuy Dao
(74) *Attorney, Agent, or Firm* — Butzel Long

(57) ABSTRACT

Methods, computer readable media, and devices for supporting fine/coarse-grained deployment of source code to environments via version control systems are disclosed. One method may include integrating, via a graphical user interface (GUI), source code into a version control system, mapping, via the GUI, an environment topology to the version control system, verifying a source code change based on a set of configurable checks, deploying, via the GUI, the source code change into one environment of the environment topology, and tracking, via the GUI, a status of the source code change.

20 Claims, 10 Drawing Sheets

Failed Transition 170
Required that Failed Transition provide UI feedback and access to debugging information.

○ Platform
⊕ DevOps Center ⋮⋮⋮
Delta PTO App
≔ Work Items
▷ Pipeline
⚙ Environments
⚙ Settings ⊙ Promotion failed.  ✕

Placeholder for failure toast; toast contents may require including more details 173

Promotion| Synchronization History

Approved Items | Integration | UAT | Staging | Production
--- | --- | --- | --- | ---
Promote Selected → | Promote Selected → | Promote Selected → | ⊙ WI-00048 Cross-pods composite initiative | Release: 2.2 Promoted by: Romeo Date: 10/31/20 11:58PM Full history...
☐ ⊙ WI-00005 Pre-fund zero administration | ⊘ Last promotion failed. Details... | ☐ ⊙ WI-00078 Mandatory system-worthy time-frame | ⊙ WI-00008 Devolved reciprocal adapter Full history... |
☐ ⊙ WI-00013 Up-sized system-worthy | ☐ ⊙ WI-00035 Horizontal object-oriented info-mediaries | ☐ ⊙ WI-00054 Open-source regional access | |
☐ ⊙ WI-00049 Stand-alone exuding attitude | ☐ ⊙ WI-00027 Enhanced bandwidth-monitored parallelism | ☐ ⊙ WI-00033 Re-contextualized 6th generation process structure | |
☐ ⊙ WI-00092 Multi-channeled full-range matrices | ☐ ⊙ WI-00037 Closed bottom-line transition | ☐ ⊙ WI-00040 Pre-emptive dedicated Graphic Interface | |
☐ ⊙ WI-00007 Right-sized intangible toolset | ☐ ⊙ WI-00094 Profit-focused incremental process improvement | ☐ ⊙ WI-00097 Self-enabling solution-oriented definition Full history... | |
☐ ⊙ WI-00097 Revolutionized systematic productivity | Full history... | | |
☐ ⊙ WI-00015 Automated bandwidth-monitored software | | | |

Logout

Placeholder for attribute on failed object creates visual c_____. Assume this attribute stays in place across sessions until next promotion attempt. 171

Placeholder for inline error msg. Assume this object stays in place across sessions until next promotion attempt. If we do History UI, then details link navigates to filtered history view; fallback is open a modal with debugging message. 172

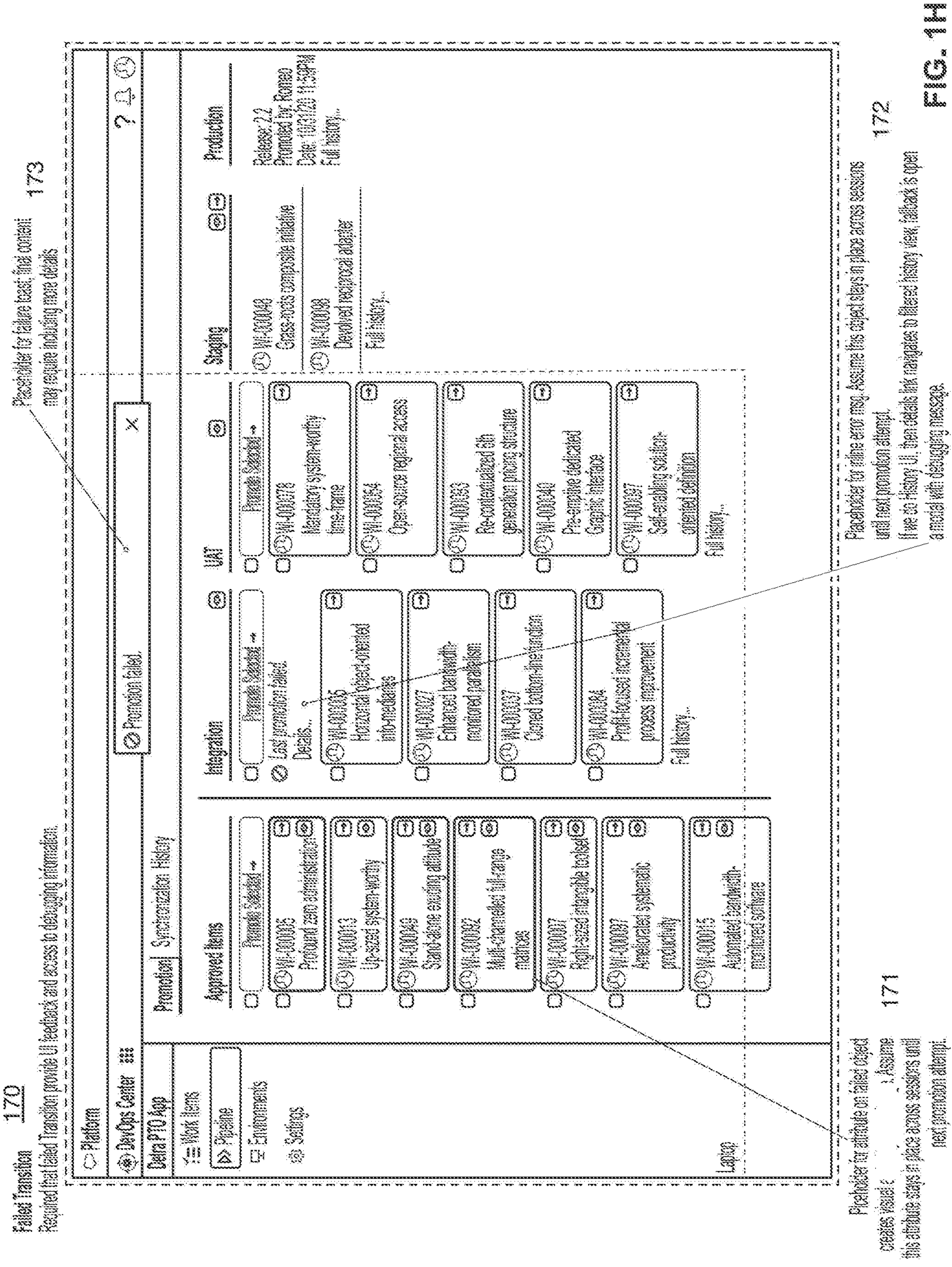

FIG. 1H

SYSTEMS AND METHODS SUPPORTING FINE/COARSE-GRAINED DEPLOYMENT OF SOURCE CODE TO ENVIRONMENTS VIA VERSION CONTROL SYSTEMS

TECHNICAL FIELD

Embodiments disclosed herein relate to techniques and systems for supporting fine/coarse-grained deployment of source code to environments via version control systems.

BACKGROUND

Citizen developers are business users with little to no coding experience that build applications with IT-approved technology. Citizen developers today are building more and more apps. Many of them are building those apps faster and more easily through point-and-click tools. However, while fast, point-and-click development may not integrate with the years of best practices from development operations (DevOps). These best practices may include, but are not limited to, the use of version control systems (to store a history of changes for tracking and compliance), deployments to lower-level environments before production, fine-grained/coarse grained deployments, and the like. Such lack of integration with DevOps best practices may increase the risks of things going wrong, especially in highly critical systems.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 1A-1H illustrate various screenshots of a graphical user interface used as part of systems and methods supporting fine/coarse-grained deployment of source code to environments via version control systems according to some example implementations.

DETAILED DESCRIPTION

Figure 1A:
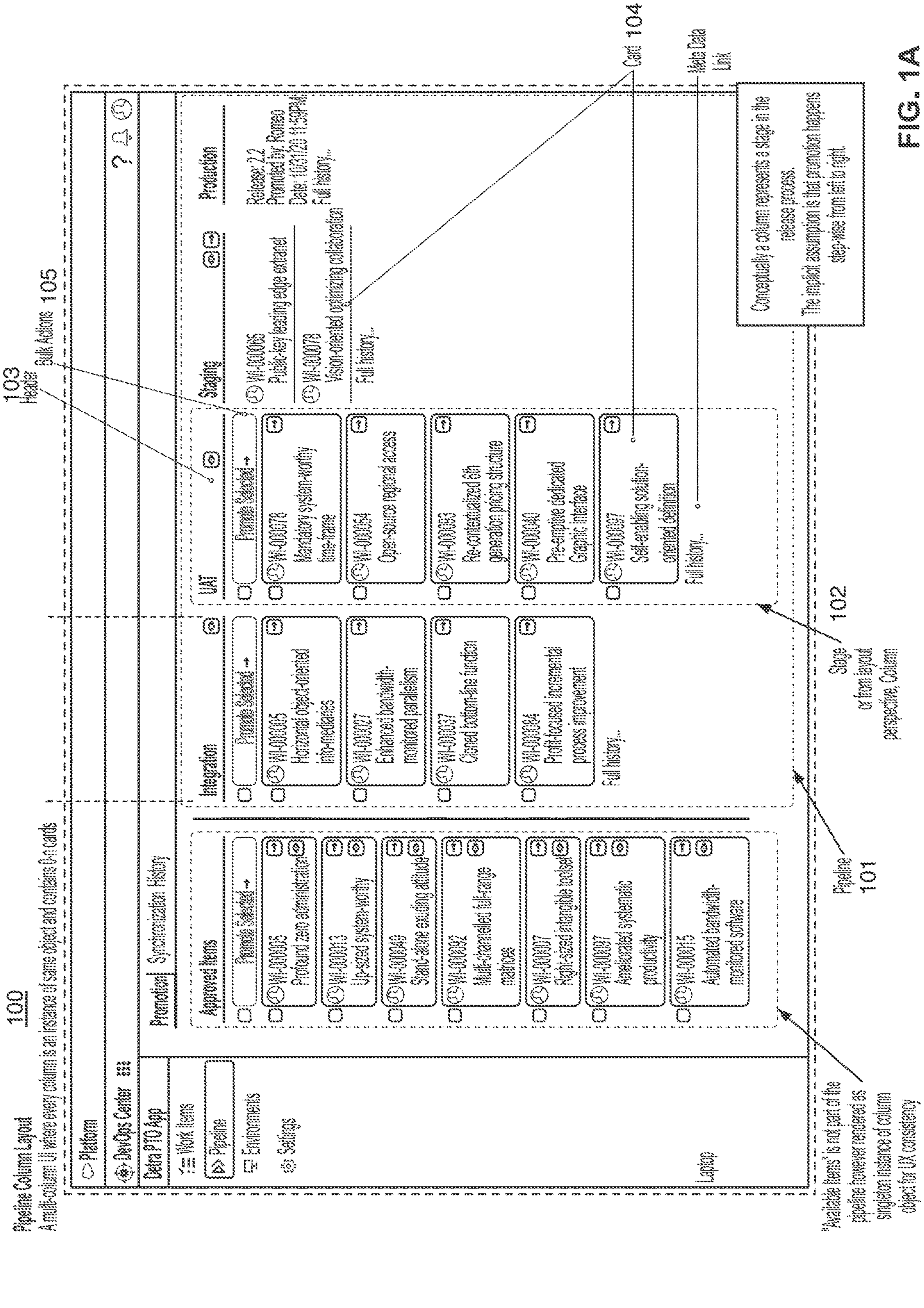

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Embodiments disclosed herein provide techniques, systems, and devices for supporting fine/coarse-grained deployment of source code to environments via version control systems. In particular, disclosed embodiments may include a graphical user interface (GUI) and associated functionality to enable utilization of version control systems and deployment of source code without executing command line executables.

Citizen developers would love to use version control systems, branching models, fine-grained/coarse-grained deployment, and the like. Unfortunately, there has not been a system that supported such DevOps related practices via point-and-click, the user interface (UI)/user experience (UX) that they are most comfortable with.

In various implements, the disclosed subject matter may present a unique point-and-click experience that is configurable to suit the citizen developer's needs, without getting in their way. In some implementations, using the disclosed DevOps center functionality, citizen developers may be able to:

1—Integrate development activities (e.g., source code changes) into a version control system without executing any command line executables. This may be done by providing a system that automatically handles commits and merges through the version control system.

2—Map out a citizen developer's entire topology of environments, all the way from integration, user-acceptance-testing, staging, up to production. These environments may than be mapped to the corresponding branches in the underlying version control system. This may be done through a wizard that walks the user through the setup process. The topology may be stored in a database as custom objects.

3—Using point-and-click, a citizen developer may select work items (representing source code) that the citizen developer has worked on and deploy those changes to the environments. In some implementations, work items may be deployed in a fine-grained manner (one-by-one) and/or a coarse-grained manner (all together).

4—Work items may be run through a series of configurable checks before being deployed to ensure safety and reliability. This may be done by providing a system that can check for merge conflicts and deployment issues. The checks to be performed may be extensible and other safety checks may be added.

5—A citizen developer may easily keep track of "where" the work item is in the environments and version control systems through a graphical user interface (GUI). This may be done by providing a system that keeps track of where the work item is in the version control system (branches and commits) and also in the different environments.

In various implementations, the disclosed subject matter brings together the following features:

1—A UI/UX for representing work items (code changes) and their process of "moving" from integration all the way to production.

2—Methods for supporting fine-grained selection of work items to be deployed. A citizen developer may be able to pick-and-choose which ones to deploy depending on the readiness and other factors.

3—Methods for supporting coarse-grained selection of work items to be deployed. A citizen developer may opt to create a "bundle", which represents an inseparable collection of work items to be deployed at once.

In various implementations, the disclosed subject includes providing status updates regarding various performed tasks. For example, status updates may be used to present real time feedback to users as an operation is in progress and/or to signal a transition to some final state of processing. The various tasks may, for example, originate from various locations and affect various objects within a data model.

In a traditional approach, a status field and a state of operation field may be added to each object within a data model in order to track a task. However, since a particular object may be involved in different tasks, such pair of status and state fields may need to be added multiple times to a single object. This adds complexity to the data model and may not be scalable.

In the disclosed subject matter, an asynchronous operation result (AOR) object may be added to a data model. The AOR object may include, for example, a field to track the status of an operation, a message field, and an error detail field. The status field may be, for example, a picklist with allowed statuses of in_progress, completed, and error. The message field may include one or more messages regarding tasks associated with an operation. The error detail field may include, for example, additional information about an error that occurred as part of an operation. Other objects within the data model may include, for example, a lookup field with a link to an AOR object to track state of the other objects. For example, a work item object may have a lookup field with a reference to an AOR object that is used to track the status of the work item when an ad hoc promotion is performed.

In one example, a work item representing a source code change is to be installed into a pipeline stage. The installation may have a corresponding model object that references an environment corresponding to the pipeline stage and the work item to be installed. When a promotion of the work item is initiated, a new AOR object may be created that represents the promotion operation. This AOR object may be associated with the work item, with both the source and destination stages, and the environment of the destination stage. Once the promotion is performed, the AOR object may be updated. For example, the lookup field may be set to completed and the message field may be set to provide a success message.

In various implementations, a method for supporting fine/coarse-grained deployment of source code to environments via version control systems may include integrating, via a graphical user interface (GUI), source code into a version control system including a plurality of branches, mapping, via the GUI, an environment topology to the version control system, verifying a source code change based on a set of configurable checks, deploying, via the GUI, the source code change into one environment of the environment topology, and tracking, via the GUI, a status of the source code change representing a location of the source code change within the version control system and the environment topology. In some implementations, the environment topology may include a plurality of environments, at least one environment may include resources to execute and evaluate at least a portion of the source code, and at least one branch of the version control system may be mapped to at least one environment.

In various implementations, the plurality of environments may include one or more environments selected from integration, user-acceptance-testing, staging, and production.

In various implementations, mapping, via the GUI, the environment topology to the version control system may include storing the environment topology in a database.

In various implementations, deploying, via the GUI, the source code change into one environment of the environment topology may include merging the source code change into one branch of the version control system, the one branch mapped to the one environment.

In some implementations, merging the source code change into one branch of the version control system may include merging the source code change without executing a command line executable.

In various implementations, the source code change may include a plurality of source code changes and the method may include receiving, via the GUI, a selection of the plurality of source code changes and creating a bundle of source code changes based on the received selection.

In some implementations, verifying a source code change based on a set of configurable checks may include verifying the bundle of source code changes by applying the set of configurable checks to the plurality of source code changes, deploying, via the GUI, the source code change into one environment of the environment topology may include deploying the bundle of source code changes into the one environment, and tracking, via the GUI, the status of the source code change may include tracking a status of the bundle of source code changes.

In various implementations, the method may further include deploying, via the GUI, the source code change into another environment of the environment topology by merging the source code change into another branch of the version control system, the other branch mapped to the other environment.

FIGS. 1A-1H illustrate various screenshots of a graphical user interface used as part of systems and methods supporting fine/coarse-grained deployment of source code to environments via version control systems according to some example implementations.

FIG. 1A illustrates a pipeline column layout 100 of a graphical user interface used as part of systems and methods supporting fine/coarse-grained deployment of source code to environments via version control systems. In various implementations, pipeline column 100 may include, for example, a pipeline 101 that includes one or more stages or columns, such as stage 102. Each stage may represent, for example, a stage within a development lifecycle including a corresponding environment. For example, stages within pipeline 101 may include an integration stage, a user-acceptance-testing stage, a staging stage, a production stage, and the like. Each stage within pipeline 101 may include, for example, a header, such as header 103, one or more cards, such as card 104, and a bulk action selection item, such as bulk actions 105. Each header may present, for example, a name for the corresponding stage. Each card may, for example, represent a work item or source code change and provide a description or other information about the work item. Each bulk action selection item may, for example, provide an ability to select one or more actions that may be taken for one or more selected cards within a stage.

Figure 1B:
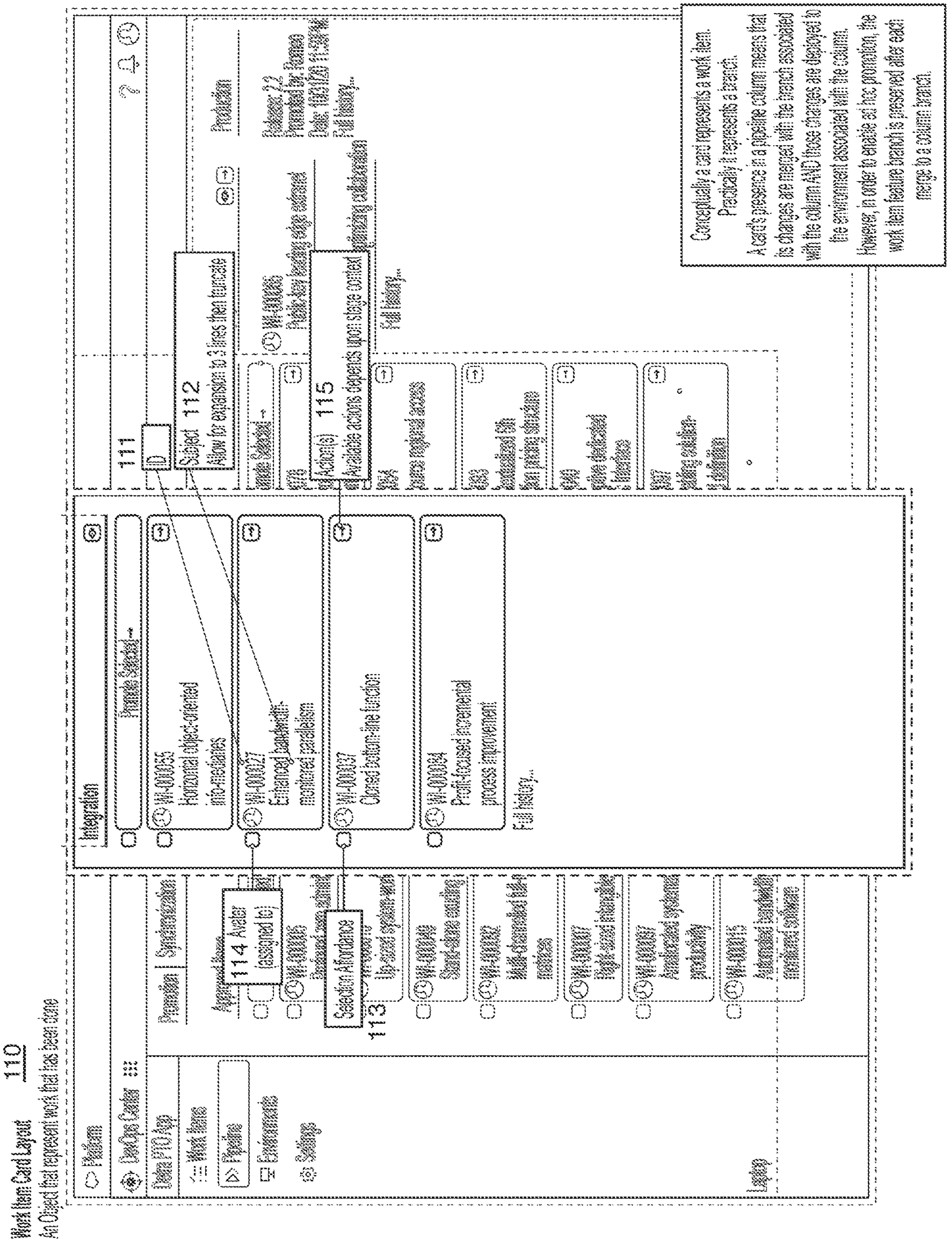

FIG. 1B illustrates a work item card layout 110 of a graphical user interface. In various implementations, a card may include, for example, an ID 111, a subject 112, a selection affordance 113, an avatar 114, and an action(s) 115. ID 111 may be, for example, an alphanumeric identifier assigned or otherwise associated with a work item. Subject 112 may be, for example, a textual subject or other description of the work item. Selection affordance 113 may be, for example, a checkbox or other element that enables selection of a work item. Avatar 114 may be, for example, an image or other item providing an indication of an individual, such as an owner or responsible party, associated with the work item. Action(s) 115 may provide, for example, a list of one or more actions to be performed in association with the work item.

Figure 1C:
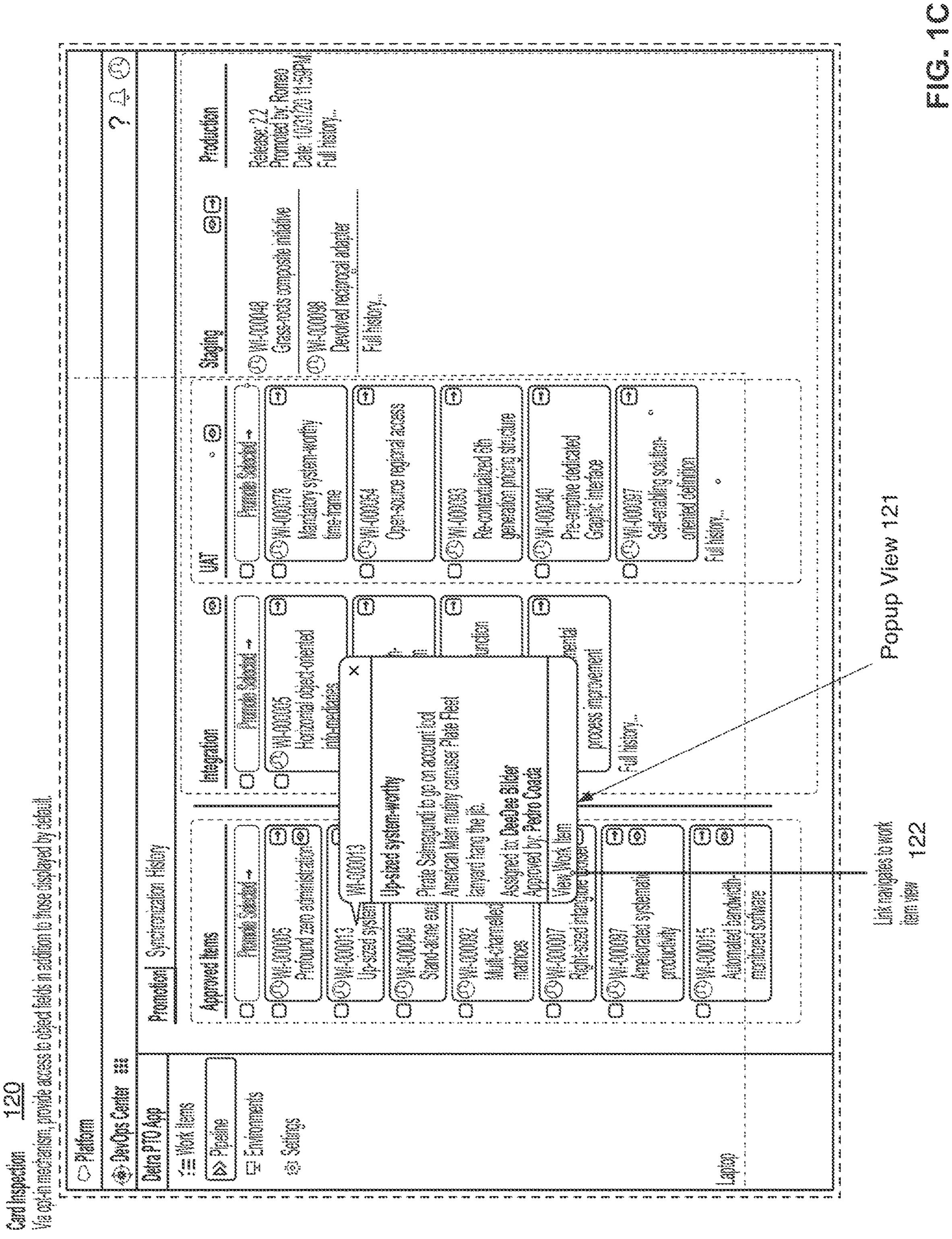

FIG. 1C illustrates a card inspection 120 of a graphical user interface. In various implementations, card inspection 102 may include, for example, a popup view 121 and a link 122. Of note, while work item card layout 110 provides an overview look for each card, card inspection 120 provides a detailed look of an individual card. For example, popup view 121 may "pop up" when a mouse hovers over a particular card and provide a detailed description of the particular card. Further in this example, link 122 may provide a link to view the particular work item.

Figure 1D:
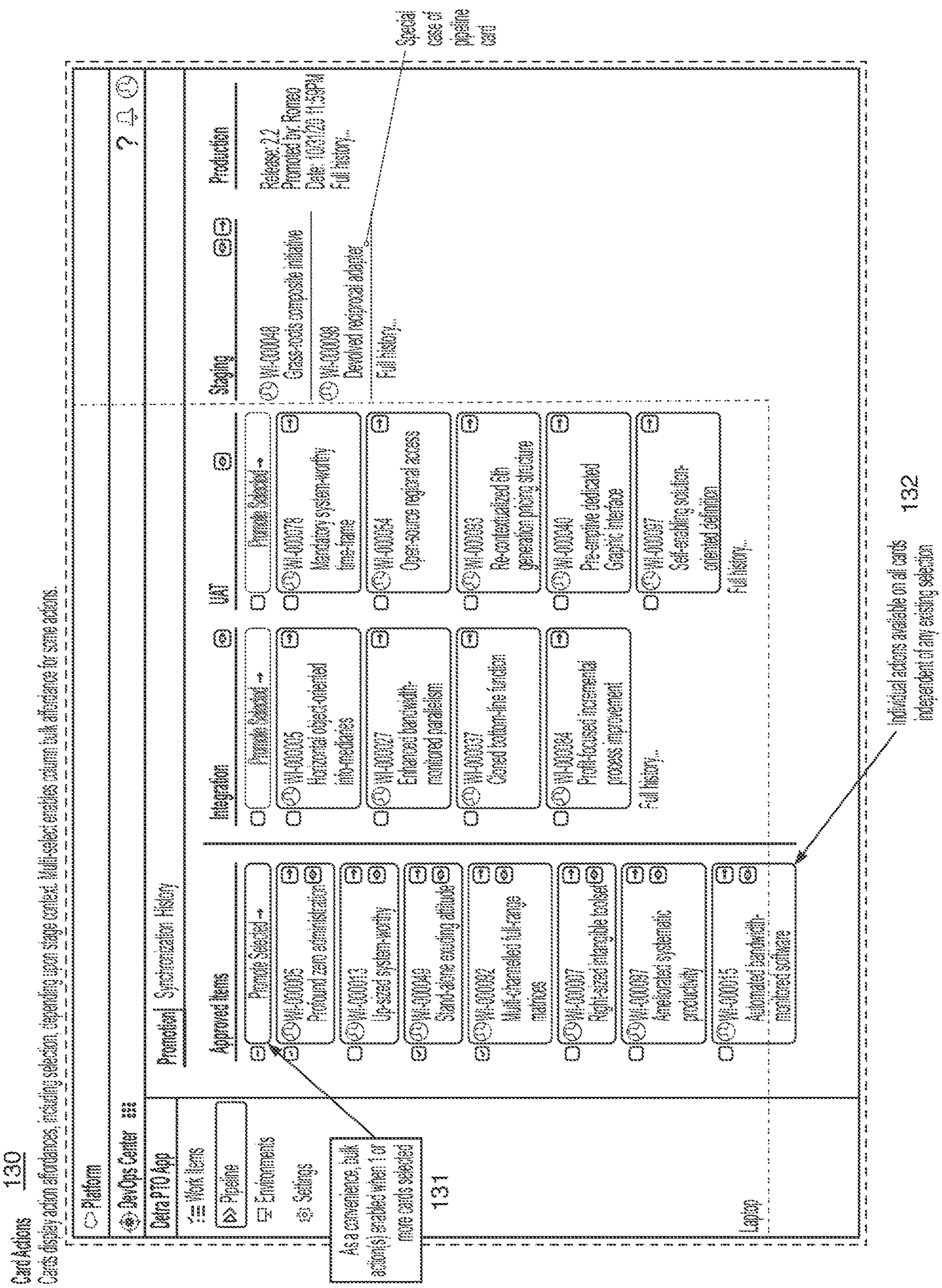

FIG. 1D illustrates card actions 130 of a graphical user interface. In various implementations, card actions 130 may include, for example, a bulk action(s) selection 131 and an individual action(s) selection, such as individual action selection 132. For example, bulk action(s) selection 131 may be utilized when one or more cards are selected while individual action selection 132 may be utilized for an individual card.

Figure 1E:
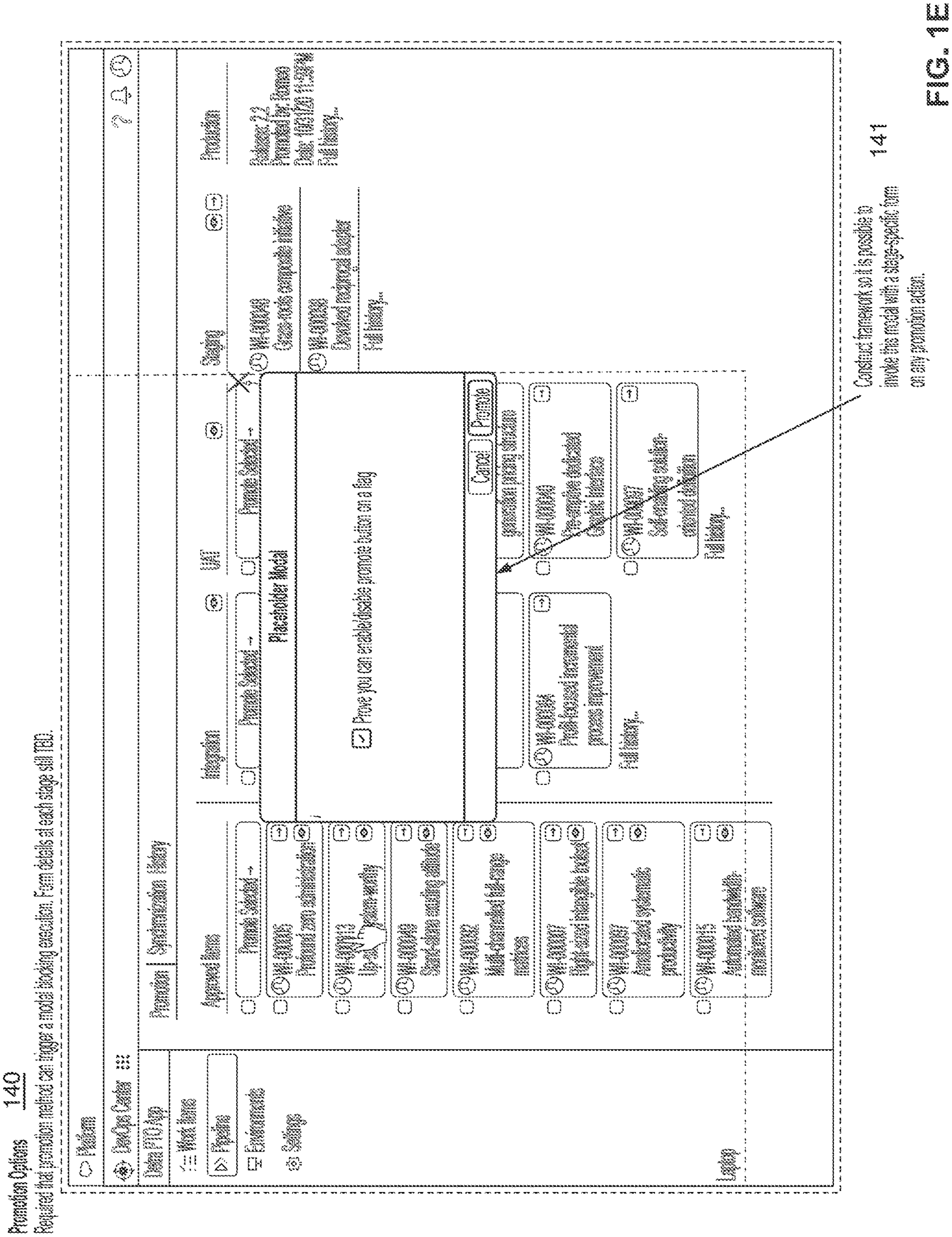

FIG. 1E illustrates promotion options 140 of a graphical user interface. In various implementations, promotion options 140 may include, for example, a stage-specific form model 141. For example, when a card is to be promoted from one stage to the next stage within a pipeline, stage-specific form modal 141 may provide detailed information about the promotion and/or prompt for confirmation that the promotion is to be performed.

Figure 1F:
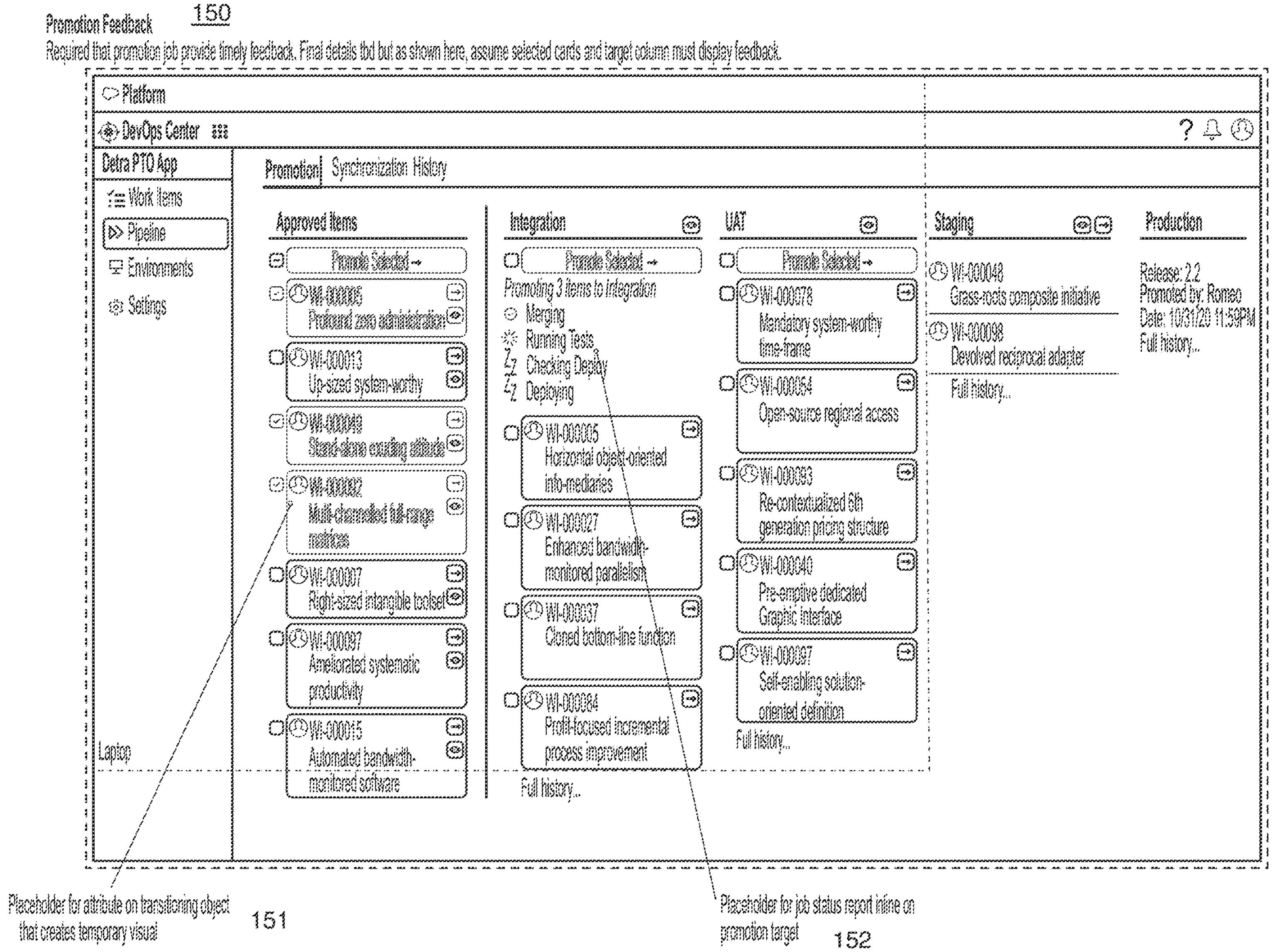

FIG. 1F illustrates promotion feedback 150 of a graphical user interface. In various implementations, promotion feedback 150 may include, for example, a transitioning object attribute placeholder 151 and a job status placeholder 152. Transitioning object attribute placeholder 151 may, for example, provide an indication of which card is being promoted. Status placeholder 152 may provide, for example, a status of the promotion process. For example, a promotion may include merging, running tests, checking deployment, and deploying a source code change associated with the card status placeholder 152 may indicate a progression through these steps.

Figure 1G:
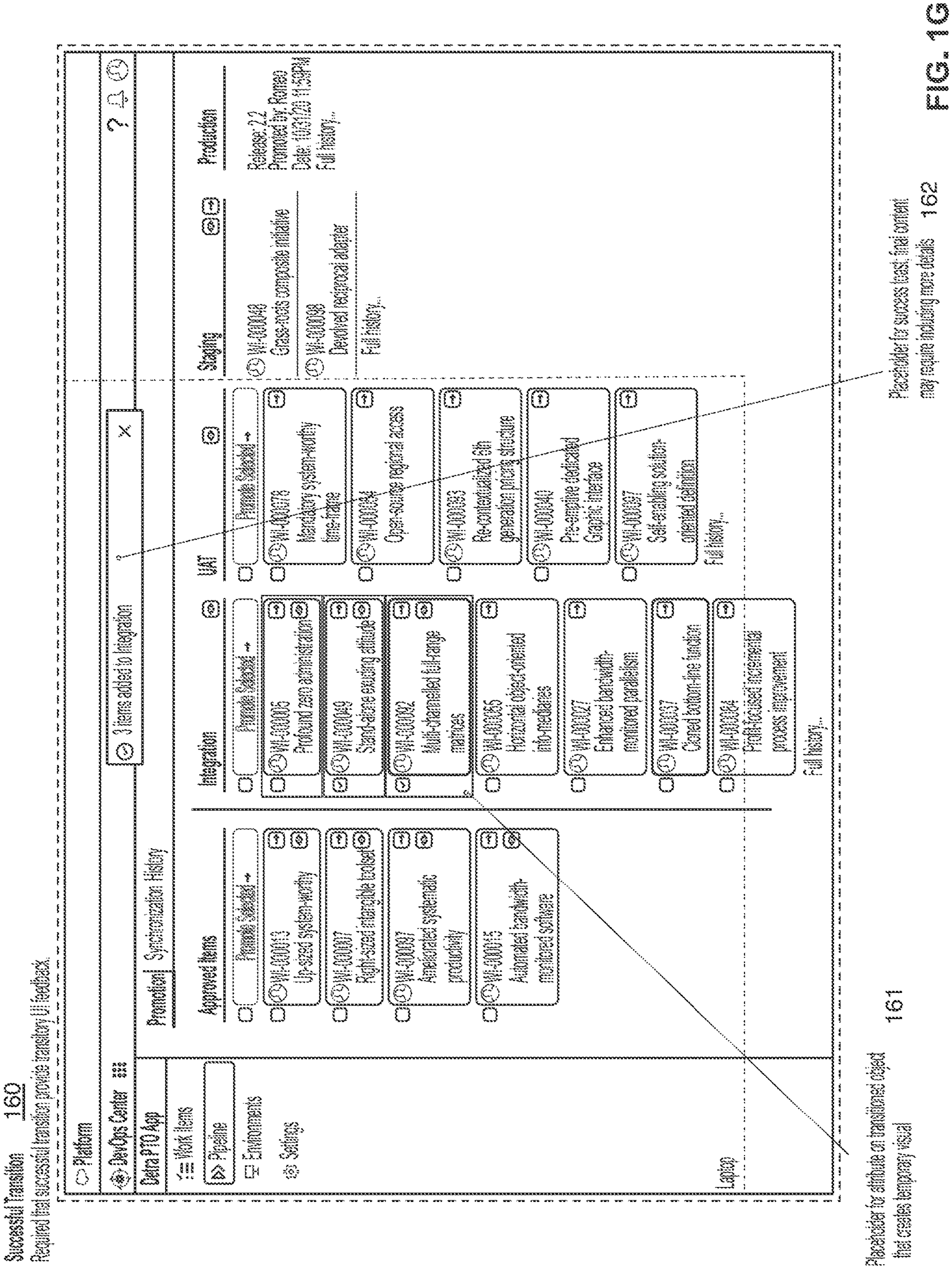

FIG. 1G illustrates successful transition 160 of a graphical user interface. In various implementations, successful transition 160 may include, for example, a transitioned object attribute placeholder 161 and a successful completion placeholder 162. Transitioned object attribute placeholder 161 may provide, for example, an indication that a card has been promoted to a new stage. Successful completion placeholder 162 may provide, for example, an indication that a promotion was completed successfully.

FIG. 1H illustrates failed transition 170 of a graphical user interface. In various implementations, failed transition 170 may include, for example, a failed object attribute placeholder 171, a failed message placeholder 172, and a failed completion placeholder 173. Failed object attribute placeholder 171 may provide, for example, an indication of which card failed to be promoted. Failed message placeholder 172 may provide, for example, an error message or other description regarding a failure to promote a card. Failed completion placeholder 173 may provide, for example, an indication that a promotion failed to complete successfully.

Figure 2:
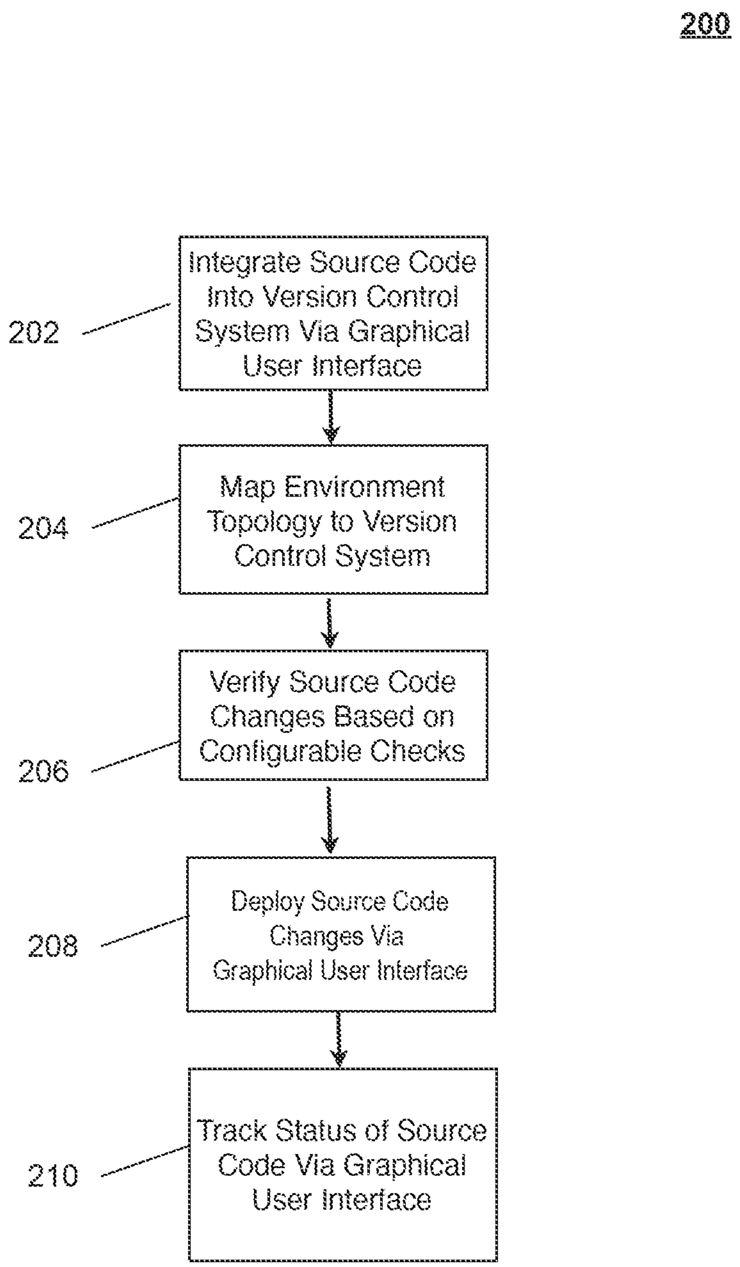
FIG. 2 is a flow diagram illustrating a method for use with supporting fine/coarse-grained deployment of source code to environments via version control systems according to some example implementations.

FIG. 2 illustrates a method 200 for supporting fine/coarse-grained deployment of source code to environments via version control systems, as disclosed herein. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, source code may be integrated into a version control system via a graphical user interface. For example, a GUI such as depicted in one or more of FIGS. 1A-1H may be utilized to integrate source code into a version control system. In some implementations, such integration may be completed without executing any command line executable. In some implementations, such integration may include automatically handling commits and merges of the source code through the version control system.

In step 204, an environment topology may be mapped to a version control system. For example, a wizard may walk a user through a process of mapping a topology of environments and mapping the environments to corresponding branches of the version control system. In some implementations, the environments may include, for example, integration, user-acceptance-testing, staging, production, and the like. In some implementations, the environment topology may be stored in a database or other data store using custom objects.

In step 206, source code changes may be verified based on configurable checks. For example, work items, representing source code changes, may be passed through a series of configurable checks to ensure safety and reliability. In some implementations, the checks may include, for example, a check for merge conflicts, a check for deployment issues, or the like.

In step 208, source code changes may be deployed via a graphical user interface. For example, a GUI such as depicted in one or more of FIGS. 1A-1H may be utilized to enable a user to select work items, representing source code changes, to be deployed to one or more of the environments. Once selected, the user, via the GUI, may then deploy the selected work items. In various implementations, selection and deployment may be in a fine-grained manner (one-by-one) and/or a coarse-grained manner (all together).

In step 210, a status of source code may be tracked via a graphical user interface. For example, a GUI such as depicted in one or more of FIGS. 1A-1H may be utilized to enable a user to track "where" a work item may be in the environments and version control system.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
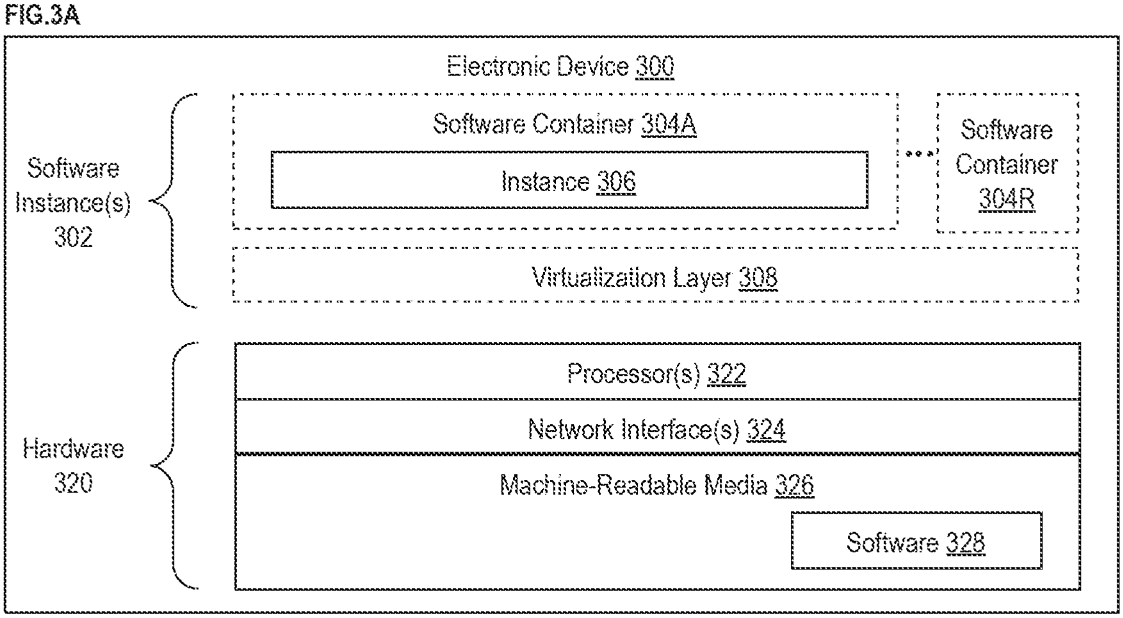
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and consolidated order manager may be implemented in one or more electronic devices 300.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
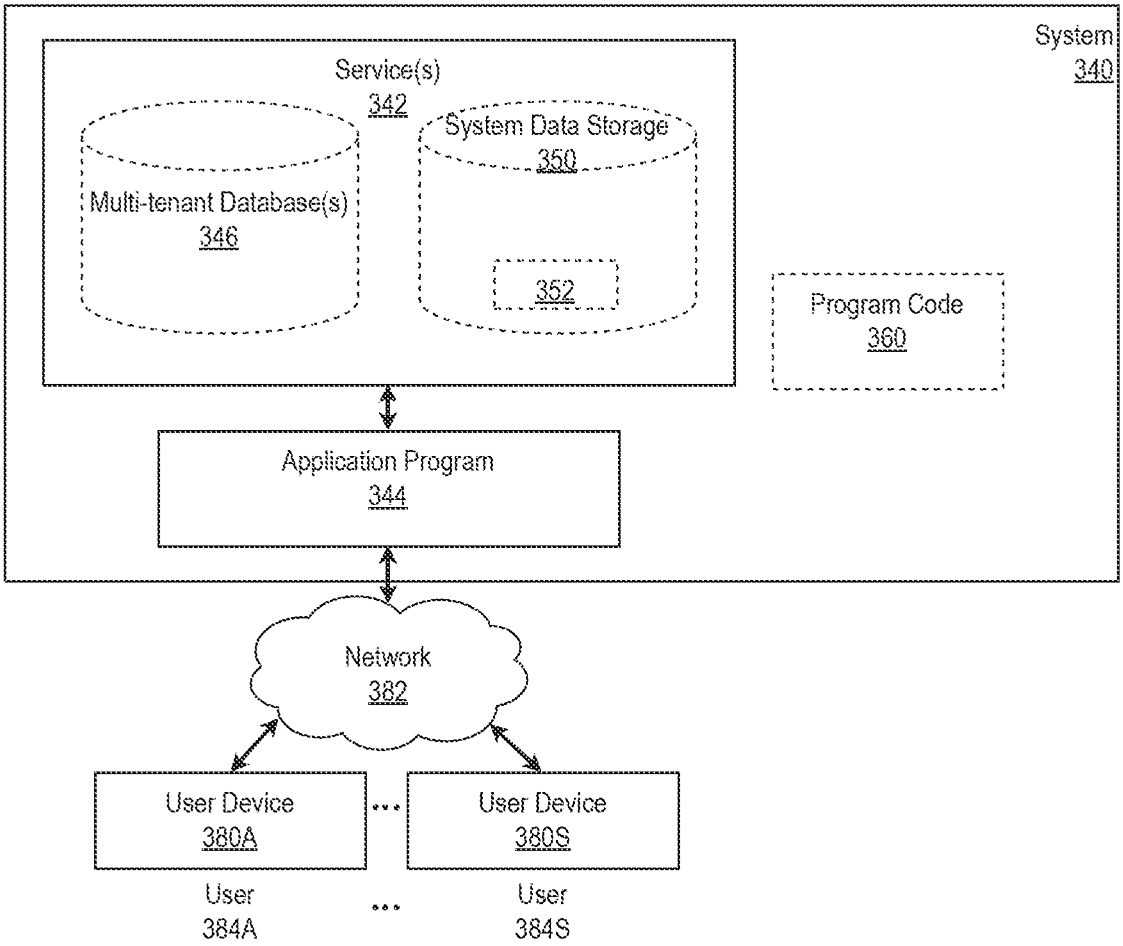
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including a consolidated order manager. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4$^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for supporting fine/coarse-grained deployment of source code to environments via version control systems, the method comprising:

integrating, via a graphical user interface (GUI), source code into a version control system comprising a plurality of branches;

mapping, via the GUI, an environment topology to the version control system, wherein:

the environment topology comprises a plurality of environments;

at least one environment comprises resources to execute and evaluate at least a portion of the source code; and at least one branch of the version control system being mapped to at least one environment;

verifying a source code change based on a set of configurable checks;

deploying, via the GUI, the source code change into one environment of the environment topology; and tracking, via the GUI, a status of the source code change, the status representing a location of the source code change within the version control system and the environment topology.

2. The computer-implemented method of claim 1, wherein the plurality of environments includes one or more environments selected from the list comprising:

integration;

user-acceptance-testing;

staging; and production.

3. The computer-implemented method of claim 1, wherein mapping, via the GUI, the environment topology to the version control system comprises storing the environment topology in a database.

4. The computer-implemented method of claim 1, wherein deploying, via the GUI, the source code change into one environment of the environment topology comprises:

merging the source code change into one branch of the version control system, the one branch mapped to the one environment.

5. The computer-implemented method of claim 4, wherein merging the source code change into one branch of the version control system comprises merging the source code change without executing a command line executable.

6. The computer-implemented method of claim 1, wherein the source code change comprises a plurality of source code changes and further comprising:

receiving, via the GUI, a selection of the plurality of source code changes; and creating a bundle of source code changes based on the received selection.

7. The computer-implemented method of claim 6, wherein:

verifying a source code change based on a set of configurable checks comprises verifying the bundle of source code changes by applying the set of configurable checks to the plurality of source code changes;

deploying, via the GUI, the source code change into one environment of the environment topology comprises deploying the bundle of source code changes into the one environment; and tracking, via the GUI, the status of the source code change comprises tracking a status of the bundle of source code changes.

8. The computer-implemented method of claim 1, further comprising:

deploying, via the GUI, the source code change into another environment of the environment topology by merging the source code change into another branch of the version control system, the other branch mapped to the other environment.

9. A non-transitory machine-readable storage medium that provides instructions that, if executed by a processor, are configurable to cause the processor to perform operations comprising:

integrating, via a graphical user interface (GUI), source code into a version control system comprising a plurality of branches;

mapping, via the GUI, an environment topology to the version control system, wherein:

the environment topology comprises a plurality of environments;

at least one environment comprises resources to execute and evaluate at least a portion of the source code; and at least one branch of the version control system being mapped to at least one environment;

verifying a source code change based on a set of configurable checks;

deploying, via the GUI, the source code change into one environment of the environment topology; and tracking, via the GUI, a status of the source code change, the status representing a location of the source code change within the version control system and the environment topology.

10. The non-transitory machine-readable storage medium of claim 9, wherein the plurality of environments includes one or more environments selected from the list comprising:

integration;

user-acceptance-testing;

staging; and production.

11. The non-transitory machine-readable storage medium of claim 9, wherein deploying, via the GUI, the source code change into one environment of the environment topology comprises:

merging the source code change into one branch of the version control system, the one branch mapped to the one environment.

12. The non-transitory machine-readable storage medium of claim 11, wherein merging the source code change into one branch of the version control system comprises merging the source code change without executing a command line executable.

13. The non-transitory machine-readable storage medium of claim 9, wherein:

the source code change comprises a plurality of source code changes; and the operations further comprise:

receiving, via the GUI, a selection of the plurality of source code changes; and creating a bundle of source code changes based on the received selection.

14. The non-transitory machine-readable storage medium of claim 13, wherein:

verifying a source code change based on a set of configurable checks comprises verifying the bundle of source code changes by applying the set of configurable checks to the plurality of source code changes;

deploying, via the GUI, the source code change into one environment of the environment topology comprises deploying the bundle of source code changes into the one environment; and tracking, via the GUI, the status of the source code change comprises tracking a status of the bundle of source code changes.

15. The non-transitory machine-readable storage medium of claim 9, wherein the operations further comprise:

deploying, via the GUI, the source code change into another environment of the environment topology by merging the source code change into another branch of the version control system, the other branch mapped to the other environment.

16. An apparatus comprising:

a processor; and a non-transitory machine-readable storage medium that provides instructions that, if executed by a processor, are configurable to cause the processor to perform operations comprising:

integrating, via a graphical user interface (GUI), source code into a version control system comprising a plurality of branches;

mapping, via the GUI, an environment topology to the version control system, wherein:

the environment topology comprises a plurality of environments;

at least one environment comprises resources to execute and evaluate at least a portion of the source code; and at least one branch of the version control system being mapped to at least one environment;

verifying a source code change based on a set of configurable checks;

deploying, via the GUI, the source code change into one environment of the environment topology; and tracking, via the GUI, a status of the source code change, the status representing a location of the source code change within the version control system and the environment topology.

17. The apparatus of claim 16, wherein deploying, via the GUI, the source code change into one environment of the environment topology comprises:

merging the source code change into one branch of the version control system, the one branch mapped to the one environment.

18. The apparatus of claim 16, wherein:

the source code change comprises a plurality of source code changes; and the operations further comprise:

receiving, via the GUI, a selection of the plurality of source code changes; and creating a bundle of source code changes based on the received selection.

19. The apparatus of claim 18, wherein:

verifying a source code change based on a set of configurable checks comprises verifying the bundle of source code changes by applying the set of configurable checks to the plurality of source code changes;

deploying, via the GUI, the source code change into one environment of the environment topology comprises deploying the bundle of source code changes into the one environment; and tracking, via the GUI, the status of the source code change comprises tracking a status of the bundle of source code changes.

20. The apparatus of claim 16, wherein the operations further comprise:

deploying, via the GUI, the source code change into another environment of the environment topology by merging the source code change into another branch of the version control system, the other branch mapped to the other environment.

* * * * *